(No Model.)
H. W. COLLINS.
SPECTACLES.
No. 510,240. Patented Dec. 5, 1893.
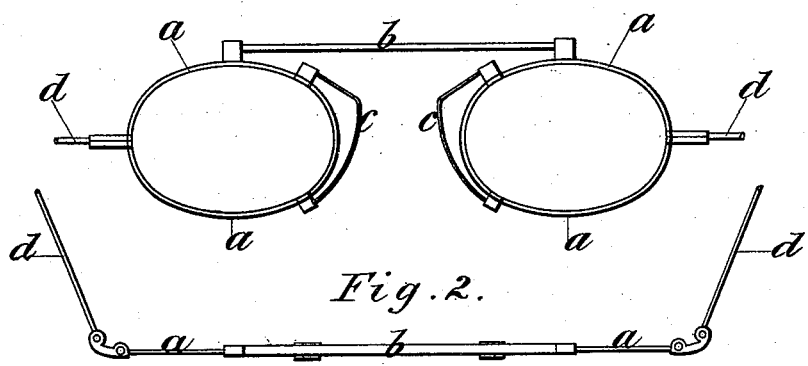
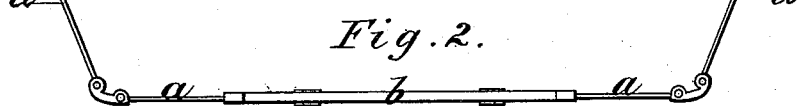
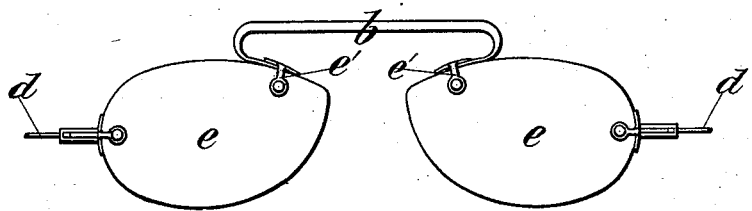
Witnesses
S. W. Gillis
John C. Wilson
Henry W. Collins,
Inventor,
by Whitman & Wilkinson
Attys.

UNITED STATES PATENT OFFICE.

HENRY WILFRED COLLINS, OF LONDON, ENGLAND.

SPECTACLES.

SPECIFICATION forming part of Letters Patent No. 510,240, dated December 5, 1893.

Application filed June 9, 1893. Serial No. 477,111. (No model.)

*To all whom it may concern:*

Be it known that I, HENRY WILFRED COLLINS, a subject of the Queen of Great Britain and Ireland, residing at London, England, have invented Improvements in Spectacles, of which the following is a specification.

My invention relates to improvements in spectacles and consists of certain novel features hereinafter described and claimed.

In the accompanying drawings Figure 1 represents a front view and Fig. 2 a plan of a pair of spectacles arranged and fitted in accordance with one form of this invention. Fig. 3 represents a front view of a modified form of the invention.

The rims $a$ in which the glasses are held are coupled by a bar $b$ below which are the side rests $c$ also rigidly fixed at each end to the rims $a$.

$d\ d$ are the usual arms hinged to the rims and extended back to be hooked behind the ears of the wearer or to bear against the sides of the head, as is well understood. The rests $c$ are so arranged in relation to the bar $b$ that when the spectacles are being worn, the said bar $b$ is kept above the nose and out of contact therewith. The bar $b$ and rests $c$ are rigid and unyielding, or sufficiently so as to cause the rests to lie against the nose without exerting the pinching or gripping action appertaining to spring glasses of the pince-nez type.

At Fig. 3 is represented a front view of a modification illustrating the application of this invention to glasses having no encircling rims. In this arrangement the bar $b$ is connected to the glasses $e$ by the links $e'$ riveted or otherwise secured to the glasses. The glasses are themselves shaped to serve as rests. The glasses may, however, be shaped as in Fig. 1 and be fitted with rests secured to them.

It will be obvious that the bar $b$ may be straight, arched, curved or otherwise shaped and also that the attachments thereof and of the rests may vary.

What I claim is—

1. In a pair of spectacles, a rigid bar secured at its ends to the glasses connecting them together above the nose, rests rigidly secured at both ends to the said glasses, and arms to secure the spectacles in place, substantially as described.

2. In a pair of spectacles, the combination with the glasses and the rims holding the said glasses, of a rigid bar secured at its ends to the said rims of the glasses connecting them together above the nose, rests rigidly secured at both ends to the rims of the glasses to rest upon the sides of the nose, and arms to secure the spectacles in place substantially as described.

In testimony whereof I have signed my name to this specification in the presence of two subscribing witnesses.

HENRY WILFRED COLLINS.

Witnesses:
FRANK A. LARKIN,
HARRY S. SAYERS,
*Both of 7 Bank Buildings, Lothbury, London, E. C.*